(12) United States Patent
Borkar et al.

(10) Patent No.: US 12,360,765 B2
(45) Date of Patent: Jul. 15, 2025

(54) PROCESSING UNIT EMPLOYING MICRO-OPERATIONS (MICRO-OPS) RANDOM ACCESS MEMORY (RAM) AS MAIN PROGRAM MEMORY

(71) Applicant: QUALCOMM Incorporated, San Diego, CA (US)

(72) Inventors: Shekhar Yeshwant Borkar, Beaverton, OR (US); Nitin Yeshwant Borkar, Redmond, WA (US); Rishi Khan, Wilmington, DE (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 18/491,455

(22) Filed: Oct. 20, 2023

(65) Prior Publication Data

US 2025/0130801 A1    Apr. 24, 2025

(51) Int. Cl.
G06F 9/30    (2018.01)
G06F 9/38    (2018.01)

(52) U.S. Cl.
CPC ...... G06F 9/30043 (2013.01); G06F 9/30141 (2013.01); G06F 9/30145 (2013.01); G06F 9/3824 (2013.01)

(58) Field of Classification Search
None
See application file for complete search history.

(56) References Cited

U.S. PATENT DOCUMENTS 5,870,601 A    2/1999    Getzlaff et al.
6,442,674 B1 *  8/2002    Lee .................... G06F 9/3808
                                                          712/E9.055

(Continued)

FOREIGN PATENT DOCUMENTS

EP    0469239 A2    2/1992
WO    9400812 A1    1/1994

OTHER PUBLICATIONS

International Search Report and Written Opinion for International Patent Application No. PCT/US2024/046389, mailed Dec. 17, 2024, 14 pages.

*Primary Examiner* — Steven G Snyder
(74) *Attorney, Agent, or Firm* — QUALCOMM Incorporated (57) ABSTRACT

Aspects disclosed in the detailed description include a processing unit (PU) employing micro-operations (micro-ops) random access memory (RAM) as main program memory. The micro-ops RAM comprises row circuits each associated with a micro-op and configured to store control signal parameters and output ports configured to be coupled to a register file and one or more execution units. In contrast to fetching and decoding instructions of an ISA in a conventional PU, the processing unit loads a main program comprising micro-ops into the row circuits of the micro-ops RAM. When executing an individual micro-op of the main program, the processing unit activates a row circuit in the micro-ops RAM to cause its stored control signal parameters to be communicated through the output ports of the micro-ops RAM to the register file and/or the one or more execution units and avoids the need for a decoding stage circuit, advantageously decreasing processing latency.

24 Claims, 9 Drawing Sheets

(56) References Cited

U.S. PATENT DOCUMENTS

| | | | | |
|---|---|---|---|---|
| 6,463,525 | B1* | 10/2002 | Prabhu | G06F 9/3824 |
| | | | | 712/E9.046 |
| 9,471,125 | B1* | 10/2016 | Gee | G06F 1/3275 |
| 9,753,733 | B2* | 9/2017 | Blasco-Allue | G06F 9/3853 |
| 10,140,126 | B2* | 11/2018 | Lin | G06F 9/3005 |
| 10,884,751 | B2* | 1/2021 | Kalamatianos | G06F 9/3802 |
| 11,016,763 | B2* | 5/2021 | Kotra | G06F 12/126 |
| 11,586,441 | B2* | 2/2023 | Kalamatianos | G06F 9/3824 |
| 2003/0145030 | A1 | 7/2003 | Sheaffer | |
| 2010/0070742 | A1 | 3/2010 | Dowling | |
| 2013/0339699 | A1* | 12/2013 | Blasco-Allue | G06F 9/382 |
| | | | | 712/241 |
| 2014/0222883 | A1* | 8/2014 | Pineiro | G06F 7/57 |
| | | | | 708/523 |
| 2016/0202985 | A1* | 7/2016 | Lin | G06F 9/30032 |
| | | | | 712/220 |
| 2020/0019406 | A1* | 1/2020 | Kalamatianos | G06F 9/30145 |
| 2020/0285466 | A1* | 9/2020 | Kotra | G06F 9/223 |
| 2021/0065758 | A1 | 3/2021 | Ghodrat et al. | |
| 2021/0149672 | A1* | 5/2021 | Kalamatianos | G06F 9/382 |
| 2021/0279054 | A1* | 9/2021 | Kotra | G06F 9/223 |

* cited by examiner

702 PROVIDING THE MICRO-OPS RAM (104), THE MICRO-OPS RAM (104) COMPRISES:
A PLURALITY OF ROW CIRCUITS (204) CONFIGURED TO STORE A PLURALITY OF REGISTER CONTROL SIGNAL PARAMETERS (310) CORRESPONDING TO A REGISTER MICRO-OP (308) TO BE PROCESSED AND A PLURALITY OF EXECUTION CONTROL SIGNAL PARAMETERS (316) CORRESPONDING TO AN EXECUTION MICRO-OP (314) TO BE EXECUTED;

704 ACTIVATING A FIRST ROW CIRCUIT(306, 312) OF THE PLURALITY OF ROW CIRCUITS (204) TO COUPLE THE PLURALITY OF REGISTER CONTROL SIGNAL PARAMETERS(310) IN THE FIRST ROW CIRCUIT (306, 312) TO A REGISTER FILE (126) TO CAUSE ONE OR MORE OPERANDS TO BE PROVIDED TO AN EXECUTION CIRCUIT(128);

706 ACTIVATING A SECOND ROW CIRCUIT(312, 318, 320) OF THE PLURALITY OF ROW CIRCUITS (204) TO COUPLE THE PLURALITY OF EXECUTION CONTROL SIGNAL PARAMETERS(316) IN THE SECOND ROW CIRCUIT (312, 318, 320) TO THE EXECUTION CIRCUIT(128) TO SELECT AN OPERATION OF THE EXECUTION CIRCUIT(128); AND

708 EXECUTING THE OPERATION BASED ON THE ONE OR MORE OPERANDS AND THE PLURALITY OF EXECUTION CONTROL SIGNAL PARAMETERS(316).

PROCESSING UNIT EMPLOYING MICRO-OPERATIONS (MICRO-OPS) RANDOM ACCESS MEMORY (RAM) AS MAIN PROGRAM MEMORY

BACKGROUND

I. Field of the Disclosure

The technology of the disclosure relates generally to computer microarchitecture.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions stored in a memory system including external memory and an instruction cache. Software instructions instruct a processor to fetch data from a location in memory and to perform one or more processor operations using the fetched data. The result may then be stored in memory.

Modern instruction set architectures (ISAs) such as RISC-V, x86 Intel®, and Arm®v8 are examples of software instructions that program PUs. Higher level languages such as C/C++ are used by programmers and automated tools to operate at a more abstract programming environment. Programs written in higher level languages are compiled and linked into the ISAs which will run on the PUs. A PU contains a series of pipeline stage circuitry. Today's PUs have various depths of pipeline stages to process a program comprising ISA instructions which are stored in memory including an instruction cache. General pipeline stages include fetching ISA instructions from memory including the instruction cache for storing recently used ISA instructions, decoding the ISA instructions, reading the input register(s) from a register file, executing the decoded ISA instructions utilizing the read register(s), and writing the result of the executed ISA instructions to the register file or memory. The decoding pipeline stage includes both combinatorial and sequential logic circuitry to decode an ISA instruction into hundreds of bits of control settings called micro-operations (micro-ops). The micro-ops are used to control data movement and operations for subsequent pipeline stages.

The decoding pipeline stage is costly with respect to latency because it decodes the ISA instructions of a program in real time. To optimize the decoding pipeline stage, some PUs include a decoding pipeline stage which includes a read only memory (ROM) which pre-decodes some of the ISA instructions into control signals by mapping an ISA opcode to a set of control signals. However, this optimization is limited to a specific ISA which limits the flexibility of the PU's hardware. Also, the pre-decoded instructions need to be retrieved through costly look-up tables. To optimize clock cycles in a pipeline, a pipeline stage may analyze windows of instructions in the pipeline to find dependencies between instructions in the window, utilize temporary registers, and arrange the timing for accessing registers. This optimization which increases the throughput of the instructions in the window is at the expense of clock cycles needed for the analysis.

SUMMARY

Aspects disclosed in the detailed description include a processing unit employing micro-operations (micro-ops) random access memory (RAM) as main program memory. Decoding circuitry imposes latency issues as a result of decoding instructions in an instruction pipeline according to an instruction set architecture (ISA) in real time. The micro-ops RAM comprises row circuits each associated with a micro-op and configured to store control signal parameters and output ports configured to be coupled to a register file and one or more execution circuits. In contrast to fetching instructions of an ISA in a conventional processing unit, the processing unit loads a main program comprising micro-ops into the row circuits of the micro-ops RAM. When executing an individual micro-op of the main program, the processing unit activates a row circuit in the micro-ops RAM to cause its stored control signal parameters to be communicated through the output ports of the micro-ops RAM to the register file and/or the one or more execution circuits and avoids the need for a decoding stage circuit, advantageously decreasing processing latency. Furthermore, since the micro-ops RAM does not store instructions from an ISA, a conventional instruction cache is also not utilized by the processing unit, advantageously repurposing the size budget of the instruction cache towards the size of the micro-ops RAM.

In this regard, in one aspect, an apparatus is disclosed. The apparatus includes a processing unit. The processing unit comprises a micro-ops RAM comprising a plurality of row circuits configured to store a plurality of register control signal parameters corresponding to a register micro-op to be processed and a plurality of execution control signal parameters corresponding to an execution micro-op to be executed. The processing unit also comprises a register file and an execution circuit. The processing unit is configured to activate a first row circuit of the plurality of row circuits to couple the plurality of register control signal parameters in the first row circuit to the register file to cause one or more operands to be provided to the execution circuit and to activate a second row circuit of the plurality of row circuits to couple the plurality of execution control signal parameters in the second row circuit to the execution circuit to select an operation of the execution circuit. The execution circuit is configured to execute the operation based on the one or more operands and the plurality of execution control signal parameters.

In another aspect, a method of operating a processing unit employing a micro-ops RAM is disclosed. The method can include providing the micro-ops RAM. The micro-ops RAM includes a plurality of row circuits configured to store a plurality of register control signal parameters corresponding to a register micro-op to be processed and a plurality of execution control signal parameters corresponding to an execution micro-op to be executed. The method also includes activating a first row circuit to couple the plurality of register control signal parameters in the first row circuit to a register file to cause one or more operands to be provided to an execution circuit, activating a second row circuit of the plurality of row circuits to couple the plurality of execution control signal parameters in the second row circuit to the execution circuit to select an operation of the execution circuit, and executing the operation based on the one or more operands and the plurality of execution control signal parameters.

In another aspect, an apparatus is disclosed. The apparatus comprises a processing unit. The processing unit comprises a micro-operations (micro-ops) random access memory (RAM). The micro-ops RAM comprises a plurality of row circuits configured to store a plurality of register control signal parameters corresponding to a register micro-op to be processed and a plurality of execution control signal parameters corresponding to an execution micro-op to be executed. The processing unit also comprises a register file and an execution circuit. The processing unit further comprises a means for activating a first row circuit of the plurality of row circuits to couple the plurality of register control signal parameters in the first row circuit to a register file to cause one or more operands to be provided to an execution circuit, a means for activating a second row circuit of the plurality of row circuits to couple the plurality of execution control signal parameters in the second row circuit to an execution circuit to select an operation of the execution circuit, and a means for executing the operation based on the one or more operands and the plurality of execution control signal parameters.

BRIEF DESCRIPTION OF THE DRAWINGS

FIGS. 3A-3C is set of figures illustrating examples of coupling the micro-ops RAM in FIGS. 1 and 2 to a register file and execution circuits to perform logic operations;

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a processing unit employing micro-operations (micro-ops) random access memory (RAM) as main program memory. Decoding circuitry imposes latency issues as a result of decoding instructions in an instruction pipeline according to an instruction set architecture (ISA) in real time. The micro-ops RAM comprises row circuits each associated with a micro-op and configured to store control signal parameters and output ports configured to be coupled to a register file and one or more execution units. In contrast to fetching instructions of an ISA in a conventional PU, the processing unit loads a main program comprising micro-ops into the row circuits of the micro-ops RAM. When executing an individual micro-op of the main program, the processing unit activates a row circuit in the micro-ops RAM to cause its stored control signal parameters to be communicated through the output ports of the micro-ops RAM to the register file and/or the one or more execution units and avoids the need for a decoding stage circuit, advantageously decreasing processing latency. Furthermore, since the micro-ops RAM does not store instructions from an ISA, a conventional instruction cache is also not utilized by the processing unit, advantageously repurposing the size budget of the instruction cache towards the size of the micro-ops RAM.

Figure 1:
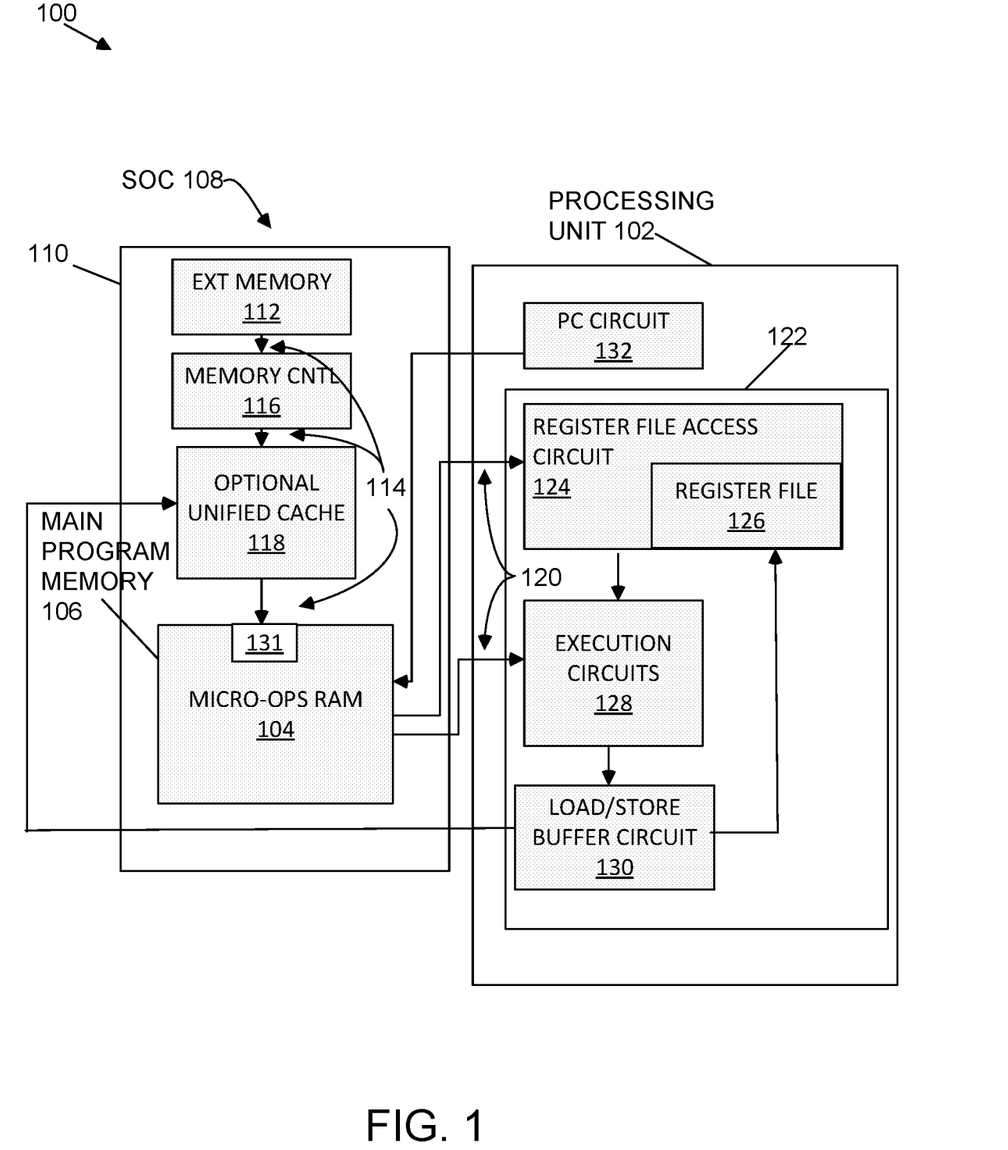
FIG. 1 is a block diagram of an exemplary processing unit system including a processing unit employing micro operations (micro-ops) random access memory (RAM) as main program memory.

In this regard, FIG. 1 is a block diagram of an exemplary processing unit system 100 including a processing unit 102 employing micro-ops RAM 104 as main program memory 106. The micro-ops RAM 104 may be static RAM (SRAM) or dynamic RAM (DRAM). The processing unit system 100 may be deployed as a system on chip (SoC) 108. The processing unit system 100 includes a memory system 110 which includes external memory 112. The memory system 110 stores a main program, also known as software or computer code, as micro-ops 114 as opposed to instructions from an instruction set architecture (ISA).

The external memory 112 may be deployed in the SoC 108 or deployed in an integrated circuit (IC) separate from the SoC 108. The processing unit system 100 includes a memory controller 116 which retrieves the micro-ops 114 from the external memory 112 to be stored into an optional unified cache 118, such as a layer two (L2) cache, and/or the micro-ops RAM 104. The optional unified cache 118 stores both micro-ops and data. The micro-ops 114 are data stored as control signal parameters 120 in a plurality of row circuits. The control signal parameters 120 correspond to asserted signals to control operation of one or more pipeline stage circuits 122 in the processing unit 102 when activated. Control signal parameters will be discussed further in connection with the discussions of FIGS. 2 and 3. The pipeline stage circuits 122 include at least a register file access circuit 124 which includes a register file 126, one or more execution circuits 128, and a load/store buffer circuit 130. The pipeline stage circuits 122 do not include a decode stage circuit since the memory system 110 stores a main program as micro-ops and not instructions from an ISA. The micro-ops RAM 104 includes is directly coupled to the register file access circuit 124. Alternatively, the circuitry for directly accessing the register file 126 may be deployed in the micro-ops RAM 104. In that case, the micro-ops RAM 104 is directly coupled to the register file 126. The micro-ops RAM 104 is also directly coupled to the one or more execution circuits 128.

In operation, the processing unit 102 loads micro-ops into row circuits of the micro-ops RAM 104 by retrieving micro-ops from the optional unified cache 118 and/or the external memory 112 through the memory controller 116. The memory controller 116 controls reading from external memory 112 and utilizes a write port 131 within micro-ops RAM 104 to load micro-ops into the micro-ops RAM 104. When deploying an optional unified cache 118, memory controller 116 loads the unified cache 118 from the external memory 112. In either case, once loaded, a program counter circuit (PC) 132 signals the micro-ops RAM 104 to read a memory address and activate a row circuit in the micro-ops RAM 104 corresponding to the memory address. If the memory address misses in the micro-ops RAM 104, the memory controller 116 loads the data associated with the memory address from the unified cache 118 and if the memory address misses in the unified cache 118, the memory controller 116 loads the data associated with the memory address from external memory 112. A row circuit will be described in more detail in connection with the discussions of FIGS. 2 and 3. Depending on the particular control signal parameters 120 stored in the activated row circuit, the micro-ops RAM 104 couples the stored control signal parameters 120 to the register file 126 to cause one or more operands to be provided to the execution circuits 128, couples the control signal parameters 120 to the execution circuits 128 to select an operation of the execution circuit (e.g., ADD, SUBTRACT, MULTIPLY, DIVIDE, and the like), or couples the control signal parameters 120 to both the register file 126 and the one or more execution circuits 128. The data result of the execution circuit 128 operating on one or more operands is forwarded to the load/store buffer circuit 130. The load/store buffer circuit 130 sends the data result to either the register file 126 or the optional unified cache 118.

Figure 2:
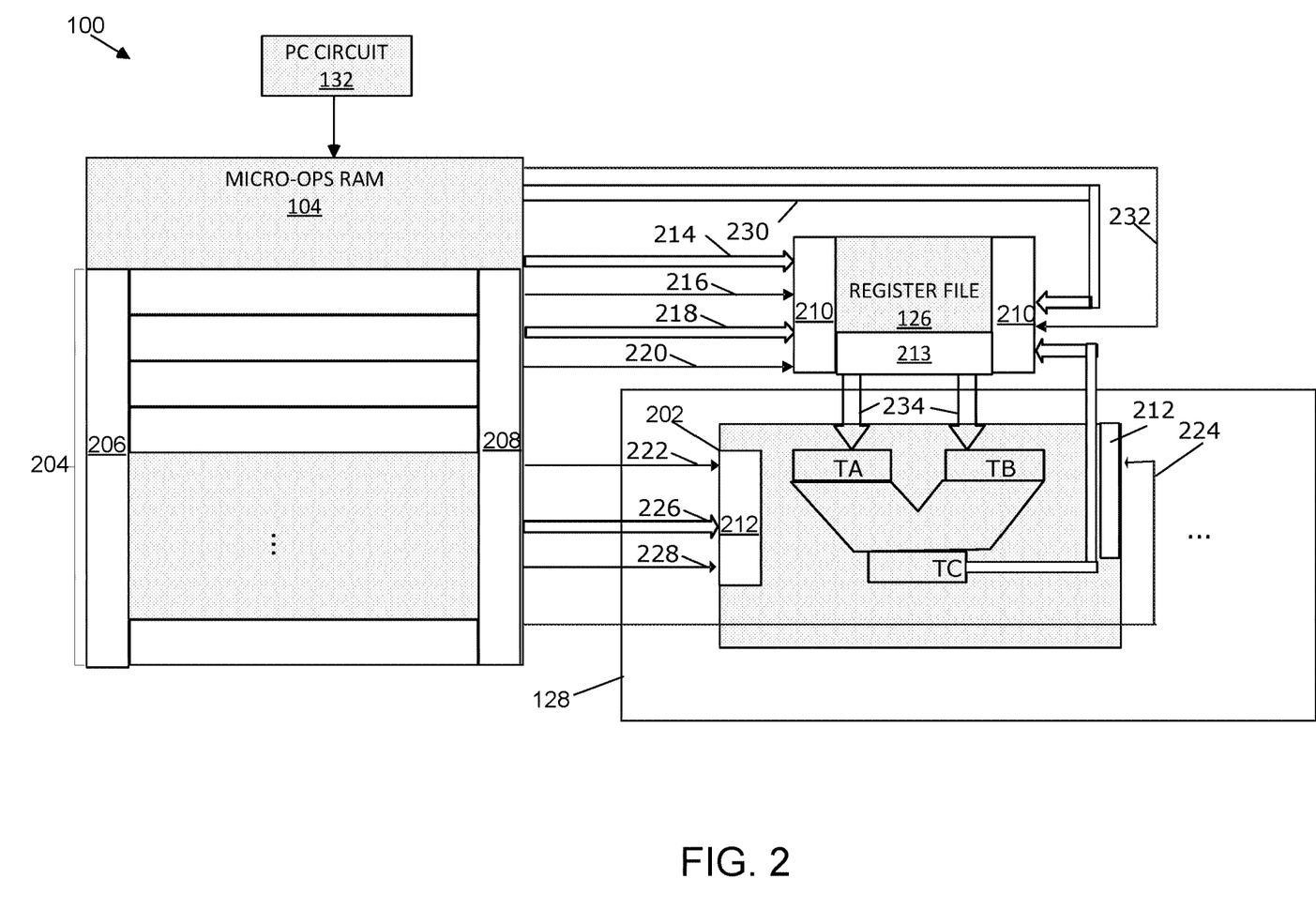
FIG. 2 is a block diagram of the exemplary processing unit system employing micro-ops RAM as main program memory in more detail than FIG. 1.

FIG. 2 is a block diagram of the exemplary processing unit system 100 employing micro-ops RAM as main program memory with more detail than FIG. 1. Common elements between the processing unit system 100 in FIG. 1 and elements of a portion of the processing unit system 100 in FIG. 2 are shown with common element numbers. The execution circuits 128 include many logic units including integer execution circuits and vector execution circuits. An arithmetic logic unit (ALU) 202 is an example of an integer execution circuit and is shown for discussion purposes. The micro-ops RAM 104 includes a plurality of row circuits 204 coupled to input ports 206 for storing micro-ops 114 and output ports 208 for outputting control signal parameters to either the register file 126 or the ALU 202. The ALU 202 includes input ports 212 coupled to the output ports 208 of the micro-ops RAM 104 to receive the control signal parameters. The register file 126 includes input ports 210 coupled to the output ports 208 of the micro-ops RAM 104 to receive control signal parameters from the micro-ops RAM 104. The input ports 210 are also coupled to the ALU 202 to receive results from the ALU 202. In one aspect, output ports 208 include a plurality of first output ports coupled to the register input ports 210 and a plurality of second output ports coupled to the execution circuit input ports 212. Additionally, the plurality of row circuits 204 include at least a first row circuit coupled to the plurality of first output ports coupled to register input ports 210 and at least a second row circuit coupled to the plurality of second output ports coupled to the execution circuit input ports 212. Furthermore, the register file 126 includes register output ports 213 wherein one or more operands are communicated from the register file 126 to the ALU 202 through register output ports 213.

Figure 3A:
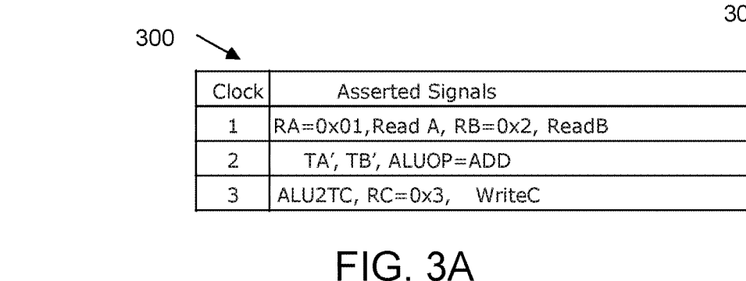
FIG. 3A is a table of exemplary asserted signals in descriptive format to accomplish adding two registers in the register file of FIGS. 1 and 2.
Figure 3B:
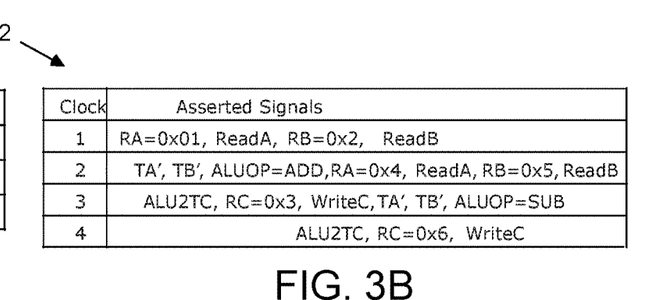
FIG. 3B is a table of exemplary asserted signals in descriptive format pipelined and optimized to accomplish adding two registers and subtracting two registers.
Figure 3C:
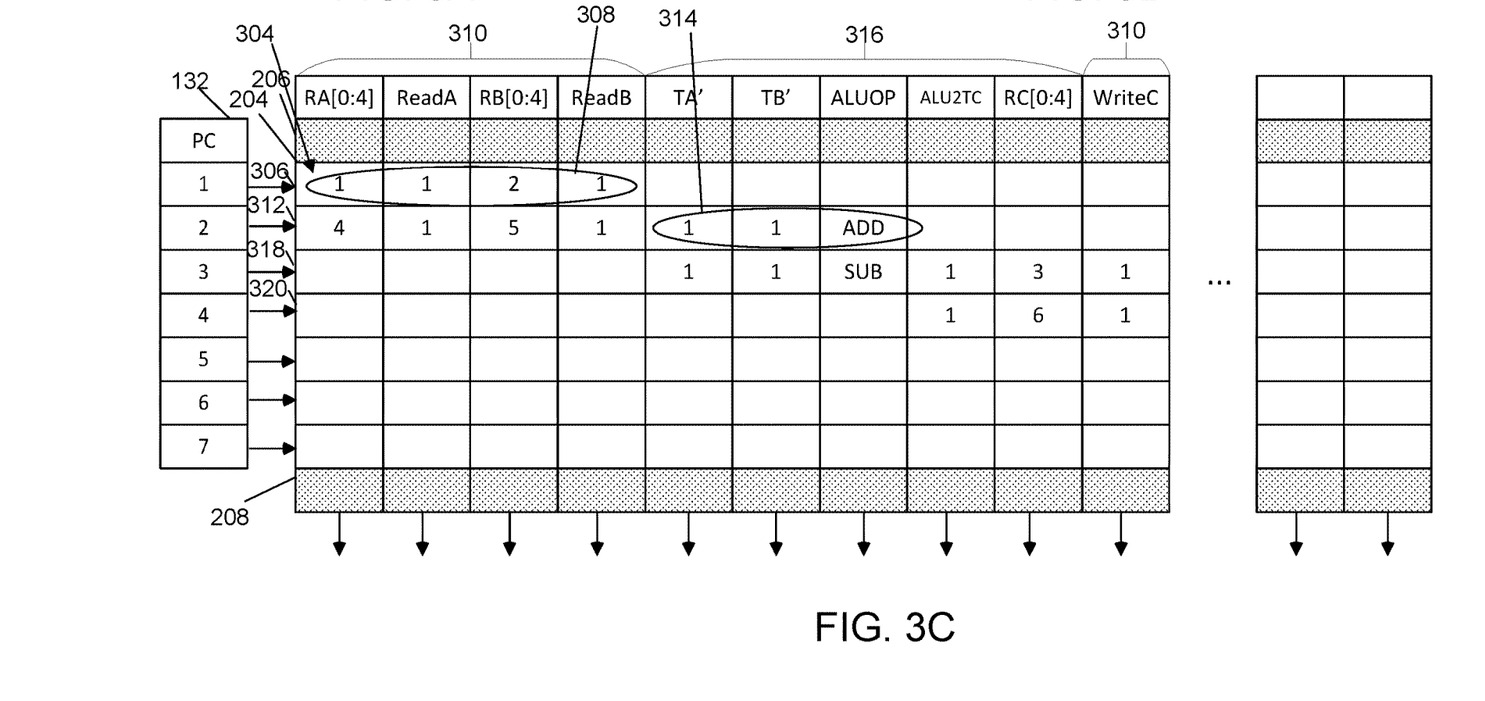
FIG. 3C illustrates exemplary row circuits in the micro-ops RAM in FIGS. 1 and 2 storing control signal parameters corresponding to exemplary asserted signals in descriptive format in FIG. 3B and a program counter for selecting a row circuit from a plurality of row circuits within the micro-ops RAM.

FIGS. 3A-3C is set of figures illustrating examples of coupling the micro-ops RAM 104 in FIGS. 1 and 2 to a register file and execution circuits to perform logic operations. FIG. 3A is a table 300 of asserted signals in descriptive format to accomplish adding two registers in the register file 126 of FIGS. 1 and 2. FIG. 3B includes a table 302 of asserted signals in descriptive format pipelined and optimized to accomplish adding two registers and subtracting two registers. FIG. 3C is an exemplary illustration of the micro-ops RAM 104 in FIGS. 1 and 2 storing control signal parameters corresponding to the micro-ops in descriptive form in FIG. 3B and the PC circuit 132 for selecting a row circuit from the plurality of row circuits 204 within the micro-ops RAM 104. As such, FIG. 2 will be described in connection with FIGS. 3A-3C.

As an example of coupling between the micro-ops RAM 104 and the register file 126 and the ALU 202, table 300 lists asserted signals in descriptive format to add register A (RA) at address 0x1 to register B (RB) at address 0x2 and write the results to register C (RC) at address 0x3. At clock 1, four signals are asserted to the register file 126 including the address of RA (RA=0x1) over path 214, control signal ReadA over path 216 to read RA into a temporary A location (TA) of the ALU 202, the address of RB (RB=0x2) over path 218, and control signal ReadB over path 220 to read RB into a temporary B location (TB) of the ALU 202. At clock 2, three signals are asserted to the ALU 202 including signal TA' over path 222 to select TA, signal TB' over path 224 to select TB, and an ADD operation signal over path 226 to add TA and TB and put the result into a temporary C location (TC) of the ALU 202. At clock 3, three signals are asserted including signal ALU2TC over path 228 to the ALU 202 to store the result in TC to the register file 126, the address of RC (RC=0x3) over path 230 to the register file 126, and signal WriteC over path 232 to write TC into RC in the register file 126.

As an example of asserted signals pipelined to accomplish the same task of adding two registers illustrated in FIG. 3A and subtracting two registers in one more clock cycle, table 302 in FIG. 3B includes asserted signals in descriptive format pipelined and optimized to accomplish adding two registers and subtracting two registers. At clock 1, four signals are asserted to the register file 126 including the address of RA (RA=0x1) over the path 214, the control signal ReadA over the path 216 to read RA into the temporary A location (TA) of the ALU 202, the address of RB (RA=0x2) over the path 218, and the control signal ReadB over the path 220 to read RB into the temporary B location (TB) of the ALU 202. At clock 2, seven signals are asserted to the ALU 202 including the signal TA' over the path 222 to select TA in the ALU 202, the signal TB' over the path 224 to select TB in the ALU 202, an ADD operation signal over the path 226 to add TA and TB and put the result into the temporary C location (TC) of the ALU 202, the address of RA (RA=0x4) over the path 214, the control signal ReadA over the path 216 to read RA into the temporary A location (TA) of the ALU 202, the address of RB (RA=0x5) over the path 218, and the control signal ReadB over the path 220 to read RB into the temporary B location (TB) of the ALU 202. At clock 3, six signals are asserted including the signal ALU2TC over the path 228 to the ALU 202 to store the result in TC to the register file 126, the address of RC (RC=0x3) over path 230 to register file 126, the signal WriteC over the path 232 to write TC into RC in the register file 126, the signal TA' over the path 222 to select TA in the ALU 202, the signal TB' over the path 224 to select TB in the ALU 202, and a SUB operation signal over the path 226 to subtract TA from TB and put the result into the temporary C location (TC) of the ALU 202. At clock 4, three signals are asserted including the signal ALU2TC over the path 228 to the ALU 202 to store the result in TC to the register file 126, the address of RC (RC=0x6) over the path 230 to the register file 126, and the signal WriteC over the path 232 to write TC into RC in the register file 126.

FIG. 3C includes exemplary row circuits 204 in the micro-ops RAM 104 in FIGS. 1 and 2 which store control signal parameters 304 corresponding to the exemplary asserted signals in descriptive format in FIG. 3B. FIG. 3C also includes the PC circuit 132 for activating a particular row circuit from the plurality of row circuits 204 within the micro-ops RAM 104. The index value of the PC circuit 132 corresponds to the clock cycle of FIG. 3B. The PC circuit 132 activates a particular row circuit during a clock cycle. When PC=1 in the PC circuit 132, a row circuit 306 is activated and the stored control signal parameters 304 in the row circuit 306 are correspondingly coupled from the output ports 208 of the micro-ops RAM 104 to the input ports 210 of the register file 126. In particular, column RA[0:4] in the row circuit 306 includes the address 0x1 of register A (RA) and is communicated over the path 214, column ReadA in the row circuit 306 includes an enable value corresponding the signal ReadA and is communicated over the path 216, column RB[0:4] in the row circuit 306 includes the address 0x2 of register B and is communicated over the path 218, and column ReadB in row circuit 306 includes an enable value corresponding to the signal ReadB and is communicated to the input port 210 of the register file 126 over the path 220. All of the control signal parameters 304 in the row circuit 306, in this example, are collectively called a register micro-op 308 and are individually referred to as register control signal parameters 310 because they are coupled to the register file 126 through their corresponding output ports 208 to cause one or more operands in the register file 126 to be provided to the execution circuit 128.

When PC=2 in the PC circuit 132, a row circuit 312 is activated and the stored control signal parameters 304 in the row circuit 312 are correspondingly coupled to the output ports 208 of the micro-ops RAM 104. In particular, column RA[0:4] in the row circuit 312 includes the address 0x4 of register A (RA), column ReadA in the row circuit 312 includes an enable value corresponding to the signal ReadA, column RB[0:4] in the row circuit 312 includes the address 0x5 of register B, and column ReadB in the row circuit 312 includes an enable value corresponding to the signal ReadB. These control signal parameters 304 are register control signal parameters 310 and are correspondingly coupled from the output ports 208 of the micro-ops RAM 104 to the input ports 210 of the register file 126. The register control signal parameters 310 in the row circuit 312 are collectively referred to as a register micro-op. The register control signal parameters 310 and their corresponding output ports 208 cause one or more operands in the register file 126 to be provided to the execution circuit 128 over path 234. Also in the row circuit 312, column TA' includes an enable value causing the signal TA' to be transmitted through one output port of the output ports 208 to one port of the input ports 212 of the ALU 202, column TB' includes an enable value causing the signal TB' to be transmitted through on output port of the output ports 208 to an input port of the input ports 212 of the ALU 202, and column ALUOP includes a value causing an ADD signal to be transmitted through one output port of the output ports 208 to an input port of the input ports 212 of the ALU 202 to select the ADD operation of the ALU 202. These control signal parameters 304 in the row circuit 312 are execution control signal parameters 316 since they couple to the execution circuits 128 such as the ALU 202 and, since they are all in the same row circuit 312, are collectively referred to as an execution micro-op 314. The execution control signal parameters 316 and their corresponding output ports 208 select an operation of an execution circuit and/or instruct the execution unit to operate on the operands. The row circuit 312 is an example where both register control signal parameters 310 and execution control signal parameters 316 are activated in the same, common row circuit 312. In other words, one or more register micro-ops 308 and one or more execution micro-ops 314 may be combined in a single row circuit depending on the size of the row circuits.

When PC=3 in the PC circuit 132, a row circuit 318 is activated and the stored control signal parameters 304 in the row circuit 318 are correspondingly coupled to the output ports 208 of the micro-ops RAM 104. In the row circuit 318, column TA' includes an enable value causing the signal TA' to be transmitted through one output port of the output ports 208 to the ALU 202 over the path 222, column TB' includes an enable value causing the signal TB' to be transmitted through one output port of the output ports 208 to the ALU 202 over the path 224, column ALUOP includes a value causing a SUB signal to be transmitted from one output port of the output ports 208 to the ALU 202 over the path 226 to select the SUB operation of the ALU 202, column ALU2TC includes a value to cause the signal ALU2TC from a corresponding output port 208 over the path 228 to the ALU 202 to store the result in the temporary C location (TC) to the register file 126, column RC[0:4] includes the address 0x3 of RC over the path 230 to the register file 126, and column WriteC includes a value to cause the signal WriteC from a corresponding output port of the output ports 208 over the path 232 to write TC into RC in the register file 126. The row circuit 318 is an example where all the control signal parameters 304 are execution control signal parameters 316 which are coupled to an execution circuit 128 such as the ALU 202.

When PC=4 in the PC circuit 132, a row circuit 320 is activated and the stored control signal parameters 304 in the row circuit 320 are correspondingly coupled to the output ports 208. In the row circuit 320, column ALU2TC includes a value to cause the signal ALU2TC from a corresponding output port 208 to be sent over the path 228 to the ALU 202 to store the result in TC to the register file 126, column RC[0:4] includes the address 0x6 of RC over the path 230 to the register file 126 to specify the address of RC to store TC, and column WriteC includes a value to cause the signal WriteC from a corresponding output port of the output ports 208 over the path 232 to write TC into RC in the register file 126. The row circuit 320 completes the pipelined operations illustrated in FIG. 3B.

Regarding the discussion above, means for activating a row circuit, means for storing micro-ops, means for loading micro-ops, and means for executing an operation in execution circuits 128 include conventional approaches depending on whether the micro-ops RAM is deployed utilizing dynamic or static logic circuit design techniques.

Figure 4:
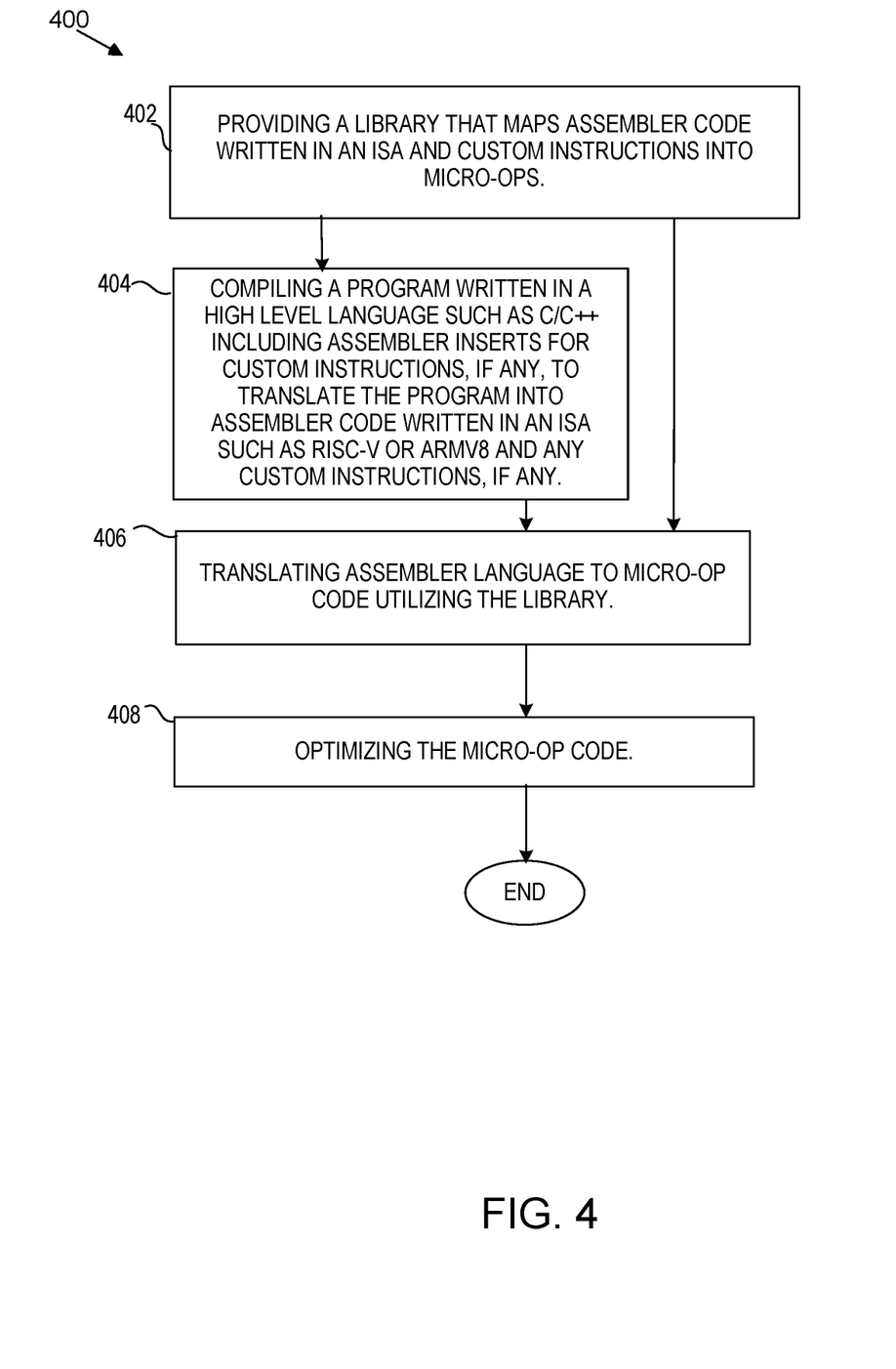
FIG. 4 is a flowchart illustrating an exemplary process for converting programs to run on a processing unit employing micro-ops RAM as main program memory, such as the processing unit and micro-ops RAM in FIGS. 1 and 2.

FIG. 4 is a flowchart illustrating an exemplary process 400 of converting programs to run on a processing unit employing micro-ops RAM as main program memory, such as the processing unit 102 and micro-ops RAM 104 in FIGS. 1 and 2. The exemplary process 400 is performed separately and at a different time than execution of the micro-ops on processing unit 102 which was described in connection with FIGS. 1-3. In this regard, a first exemplary step in the process 400 of FIG. 4 can include providing a library that maps assembler code written in an ISA such as RISC-V, Arm®v8, x86 Intel®, or the like, into micro-ops (block 402). If one is starting with source code written in a high-level language, the next step of the process 400 may include compiling a program written in a high-level language such as C/C++ including assembler inserts for custom instructions, if any, to translate the program into assembler code and any customer instructions, if any (block 404). A custom instruction may be developed by a user such as a software designer who has knowledge of how micro-ops interface with the processing unit 102 and, in particular, to the register file 126 and execution circuits 128. With this knowledge the user can create inserts of micro-ops into the program. An example of translating a code snippet written in RISC-V to micro-ops is discussed in connection with FIG. 5. If one is starting with assembled code, the next step of the process 400 may be block 406. At block 406, the next step of the process 400 may include translating assembler code including any customer instructions utilizing the provided library (block 406). The next step of the process 400 may include optimizing the micro-ops to provide efficient execution by a processing unit employing micro-ops RAM as main program memory. An example of optimizing the micro-ops will be discussed in connection with FIG. 6.

Figure 5:
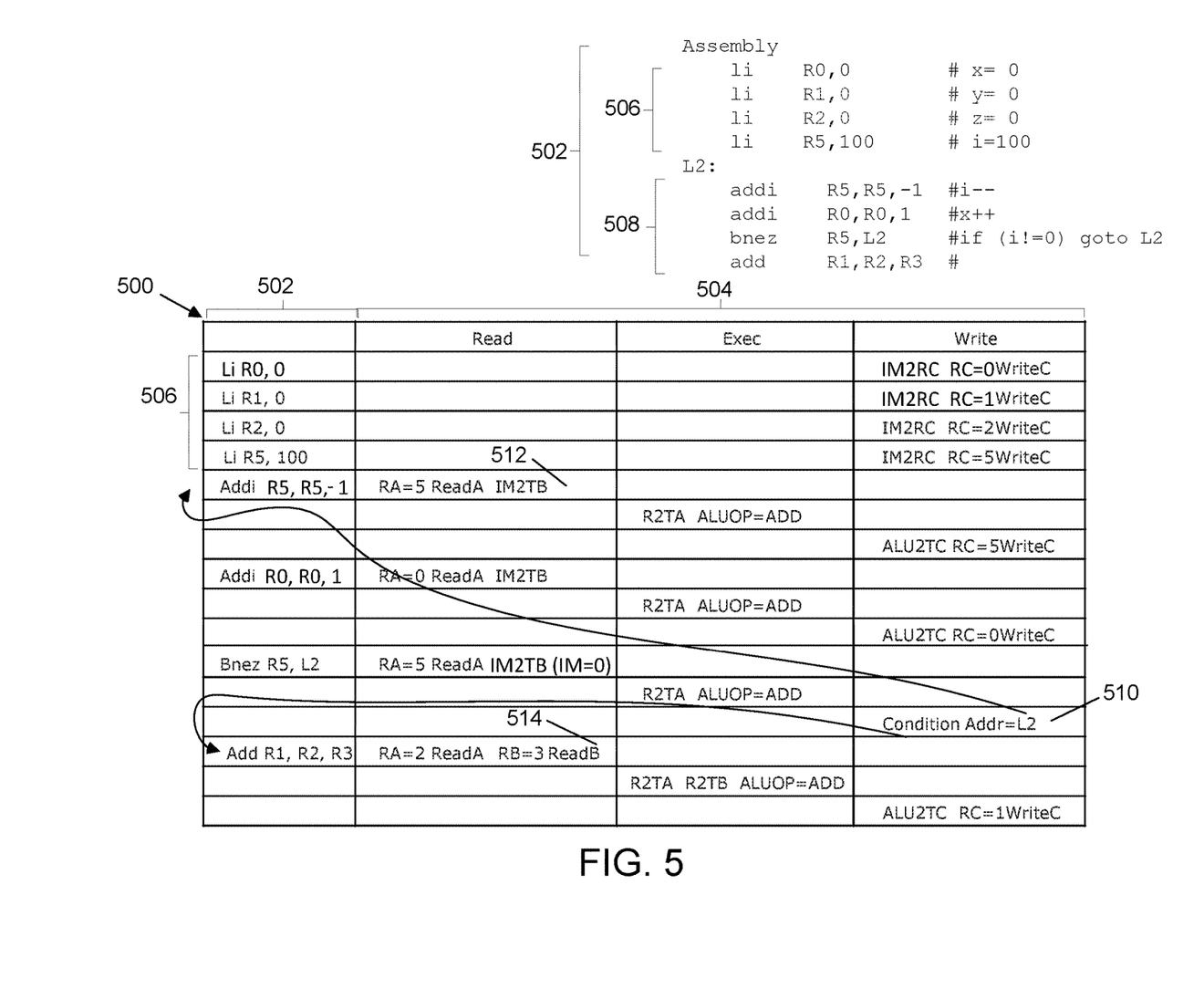
FIG. 5 is a diagram illustrating an exemplary translation of a code snippet written in RISC-V to micro-ops.

FIG. 5 is a diagram illustrating an exemplary translation 500 of a code snippet 502 written in RISC-V assembler code to micro-ops 504 in descriptive format. Each instruction of code segment 506 translates into corresponding write micro-ops with not read or execute micro-ops. Code segment 508 is a re-entrant code segment. Each instruction in the code segment 508 translates into three sequential read, write, and execute micro-ops. Without optimization, each row in the translation 500 would be executed in a computer clock cycle. As such, the sixteen rows indicate that this unoptimized code will execute in sixteen clock cycles. Micro-op 510 is a branch instruction which, depending on the condition of the branch at run-time, the next micro-op to be executed is either micro-op 512 or micro-op 514.

Figure 6:
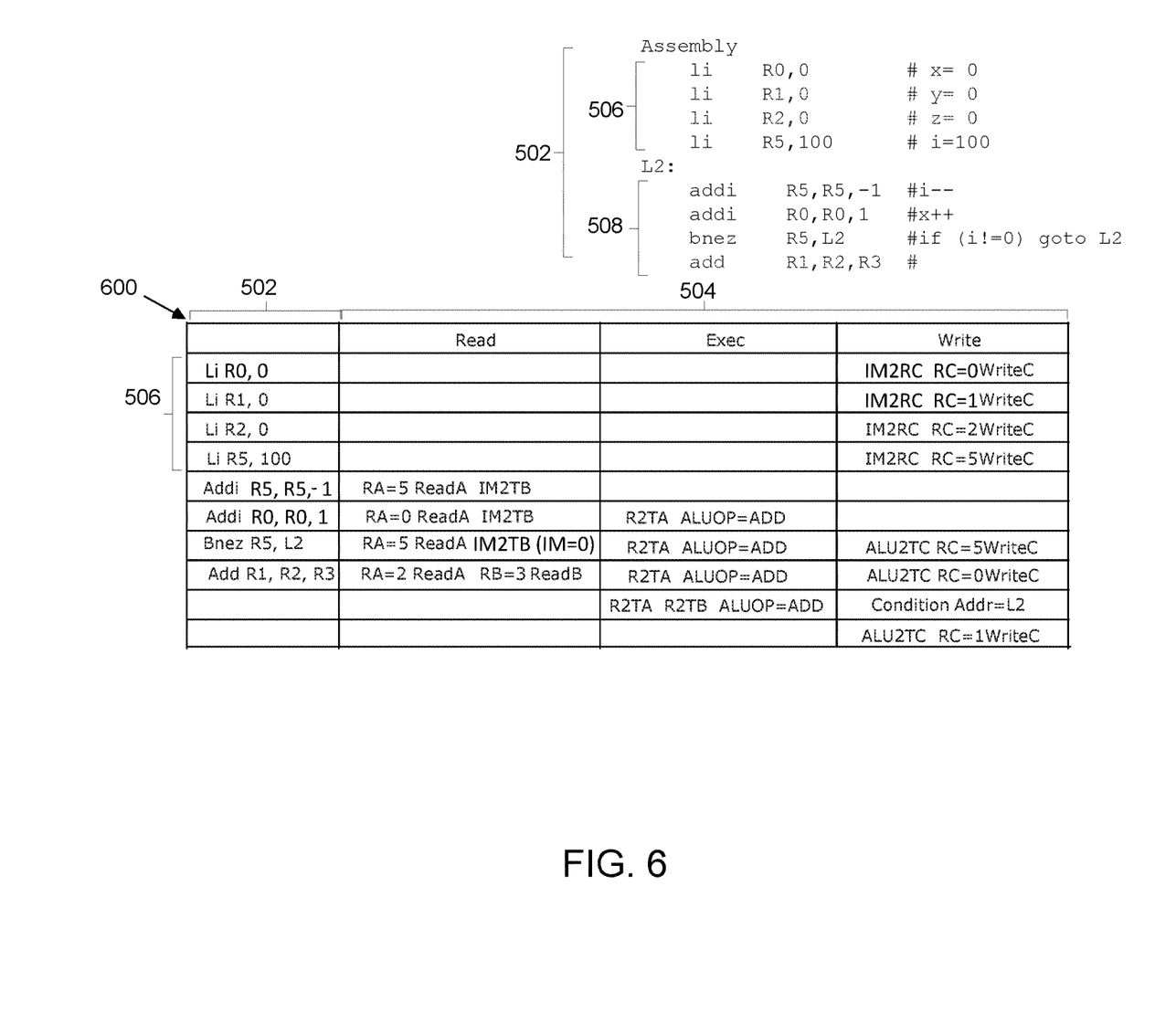
FIG. 6 is a diagram illustrating an exemplary optimization of micro-ops translated in FIG. 5.

FIG. 6 is a diagram illustrating an exemplary optimization 600 of the micro-ops translated in FIG. 5. Utilizing conventional optimization and pipelining techniques which resolve dependencies that are typically performed in conventional decoding stage circuits, the optimization 600 is performed on the code segment 508 during the optimization block 408 in FIG. 4. As a result of the optimization 600, the code snippet 502 can be executed by the processing unit 102 in ten clock cycles which is six cycles faster than the unoptimized micro-ops in FIG. 5.

Figure 7:
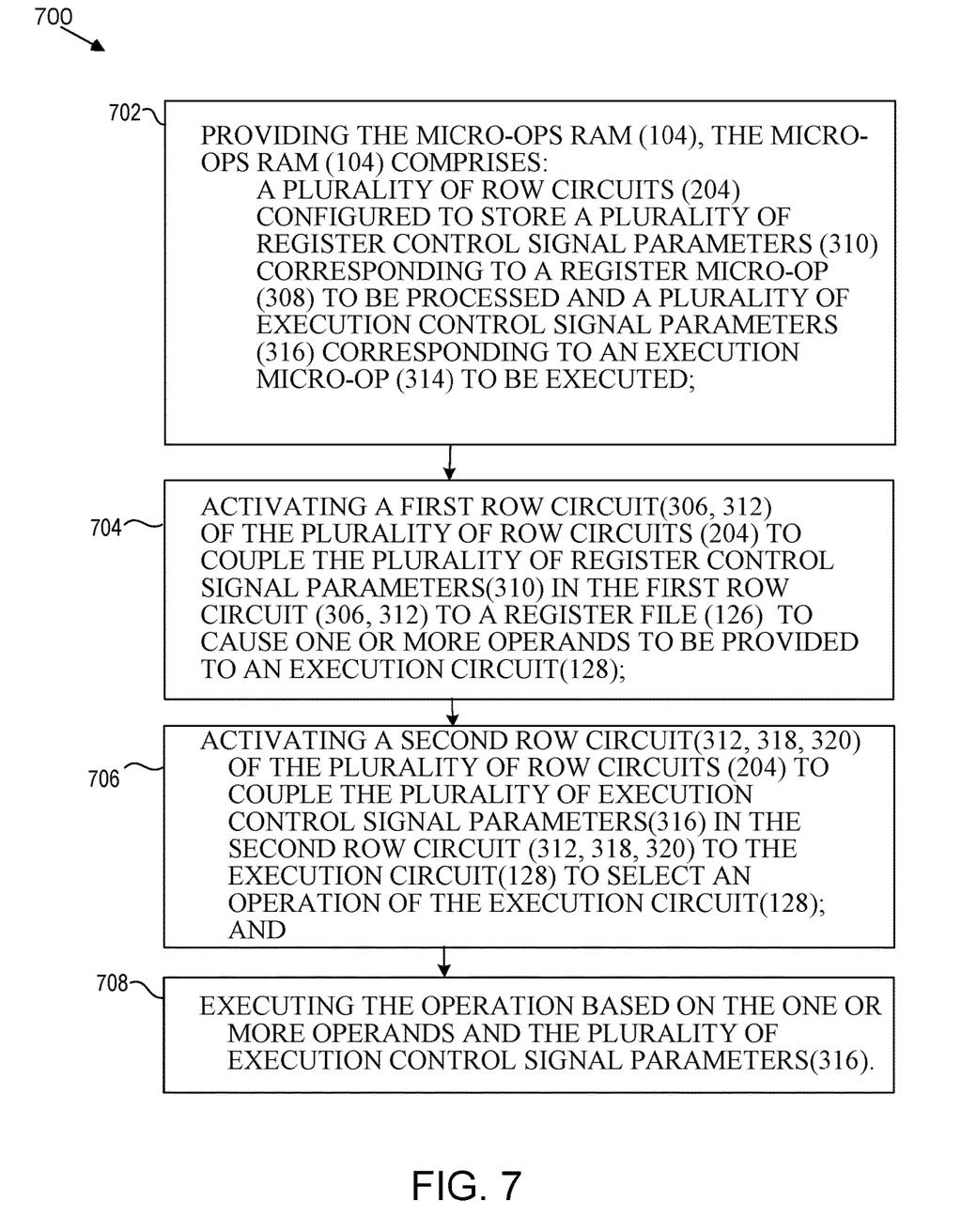
FIG. 7 is a flowchart illustrating an exemplary process of operating a processing unit employing micro-ops RAM as main program memory, such as the processing unit and micro-ops RAM in FIGS. 1 and 2.

FIG. 7 is a flowchart illustrating an exemplary process 700 of operating a processing unit employing micro-ops RAM as main program memory, such as the processing unit 102 and micro-ops RAM 104 in FIGS. 1 and 2. In this regard, a first exemplary step in process 700 of FIG. 7 can include providing the micro-ops RAM 104. The micro-ops RAM 104 includes a plurality of row circuits 204 configured to store a plurality of register control signal parameters 310 corresponding to a register micro-op 308 to be processed and a plurality of execution control signal parameters 316 corresponding to an execution micro-op 314 to be executed (block 702). A next step in the process 700 can include activating a first row circuit 306 to couple the plurality of register control signal parameters 310 in the first row circuit 306 to a register file 126 to cause one or more operands to be provided to an execution circuit 128 (block 704). A next step in the process 700 can include activating a second row circuit 312 of the plurality of row circuits 204 to couple the plurality of execution control signal parameters 316 in the second row circuit 312 to the execution circuit 128 to select an operation of the execution circuit 128 (block 706). A next step in the process 700 can include executing the operation based on the one or more operands and the plurality of execution control signal parameters 316.

Returning to micro-ops RAM 104, a row circuit of the row circuits 204 are activated for reading control signal parameters into micro-ops RAM 104 and writing, also known as storing, control signal parameters out of micro-ops RAM 104. In particular, a row circuit of the row circuits 204 is activated to couple register control signal parameters 310 in the row circuit to the register file 126 to cause one or more operands to be provided to an execution circuit of the execution circuits 128. Additionally, a row circuit of the row circuits 204 is activated to couple execution control signal parameters 316 in the row circuit to select an operation of an execution circuit of the execution circuits 128.

Figure 8:
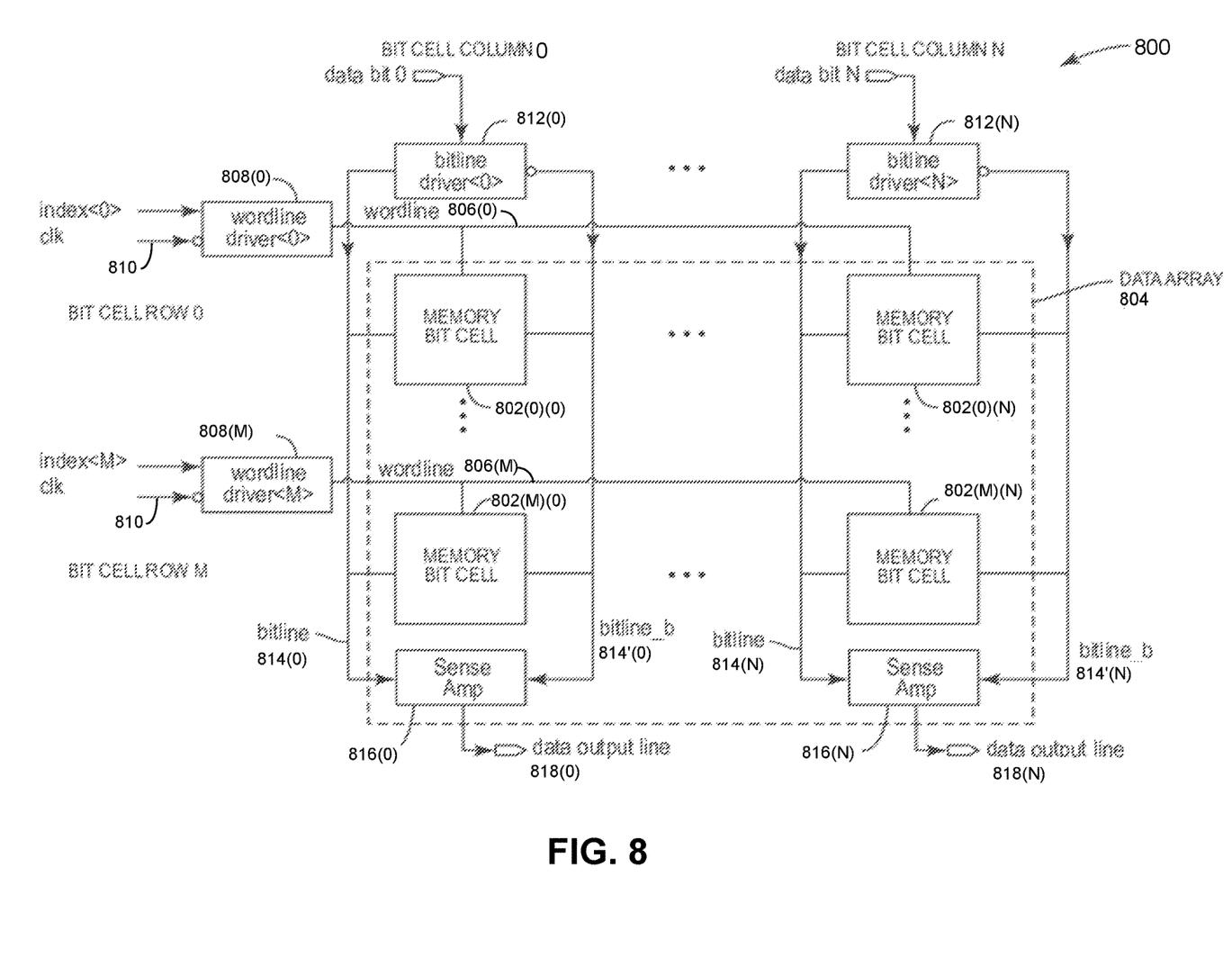
FIG. 8 is a schematic diagram of an exemplary static random access memory (SRAM) system employed as a micro-ops RAM discussed in FIGS. 1-3, the SRAM comprising a data array of static memory bit cells organized in rows and columns for storing data.

In this regard, FIG. 8 is a schematic diagram of an exemplary static random access memory (SRAM) system 800 employed as a micro-ops RAM such as micro-ops RAM 104 discussed in FIGS. 1-3. Exemplary SRAM system 800 employs memory bit cells 802(0)(0)-802(M)(N) ("bit cells 802(0)(0)-802(M)(N)) for storing data in a data array 804. The data array 804 is organized as having 'M+1' bit cell columns and 'N+1' bit cell rows of bit cells 802 supporting an "N+1" bit wide data word. A bitline driver 812(0)-812(N) is provided for each bit cell column 0-N to drive a selected bitline 814(0)-814(N) and a complement bitline (bitline_b) 814'(0)-814'(N) for read and write operations. A wordline driver 808(0)-808(M) is provided for each bit cell row 0-M in the data array 804 to control access to the addressed bit cells 802( )(0)-802( )(N) in a given bit cell row 0-M based on an index(0)-index(M) decoded from a memory address indicating the bit cell row 0-M to be selected. A clock signal (clk) 810 controls the timing of asserting the activated wordline 806(0)-806(M) to access a row of bit cells 802( )(0)-802( )(N) in the selected bit cell row 0-M. The wordline driver 808(0)-808(M) for the selected bit cell row 0-M causes the data stored in the selected bit cells 802( )(0)-802( )(N) to be asserted onto the bitlines 814(0)-814(N) and complement bitlines 814'(0)-814'(N) to be sensed by sense amplifiers 816(0)-816(N) provided in each bit cell column 0-N. The sense amplifiers 816(0)-816(N) provide the data bits from the selected bit cells 802( )(0)-802( )(N) onto respective data output lines 818(0)-818(N).

Electronic devices that include a processing unit employing a micro-ops RAM as discussed in FIGS. 1-3C and according to, but not limited to, any of the exemplary processes 400 and 700 in FIGS. 4 and 7, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, and a multicopter.

Figure 9:
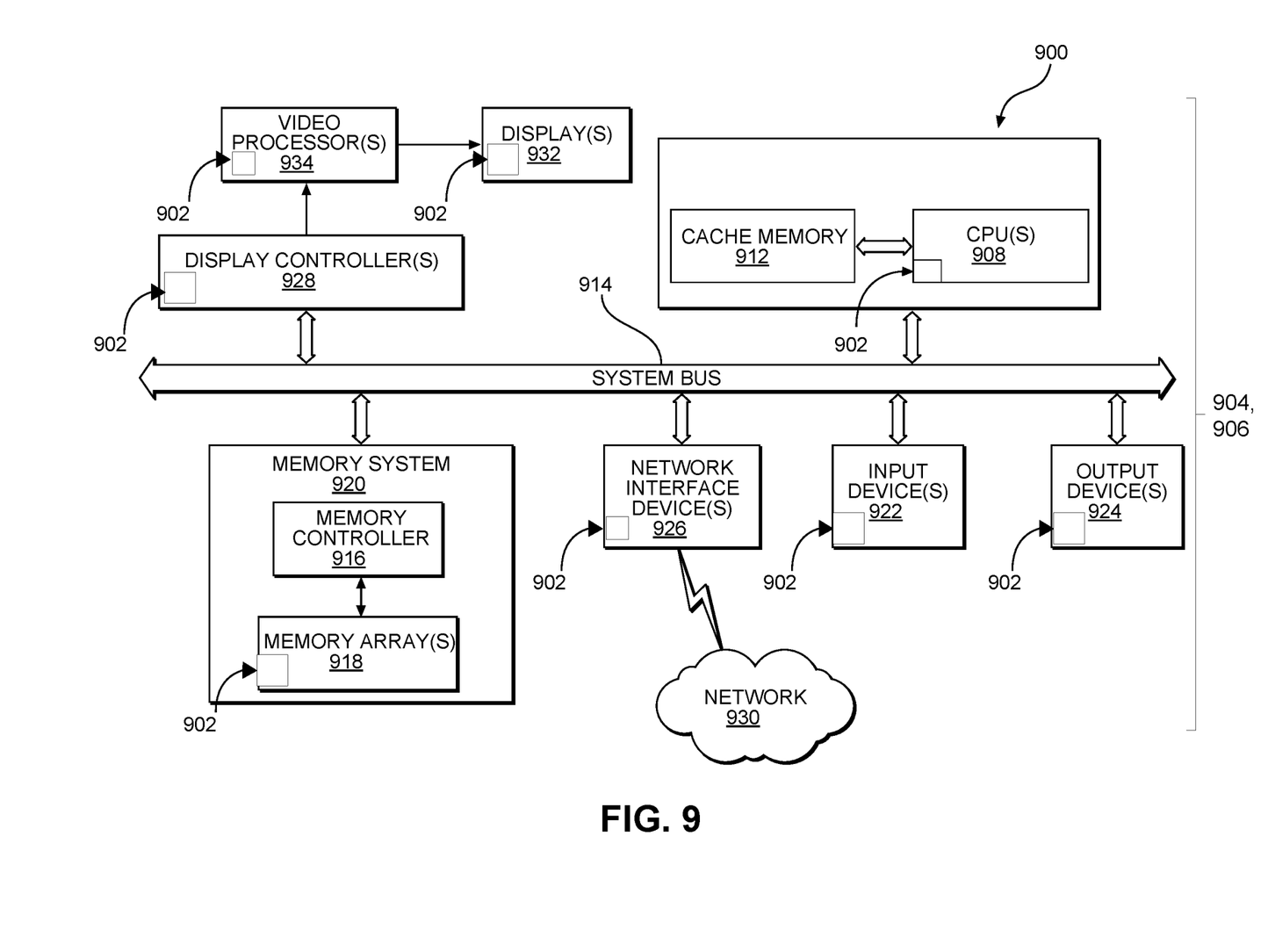
FIG. 9 is a block diagram of an exemplary processor-based system that can include a processing unit and a micro-ops RAM as main program memory, such as the processing unit and micro-ops RAM in FIGS. 1 and 2.

In this regard, FIG. 9 is a block diagram of an exemplary processor-based system 900 that can include a processing unit and a micro-ops RAM as main program memory, such as the processing unit 102 and micro-ops RAM 104 in FIGS. 1 and 2, and according to, but not limited to, any of the exemplary processes 400 and 700 in FIGS. 4 and 7, and according to any aspects disclosed. In this example, the processor-based system 900 may be formed as an IC 904 in one or more processing units such as a central processing unit (CPU) 908 deploying a micro-ops RAM 902 and as a system-on-a-chip (SoC) 906. The processor-based system 900 includes a central processing unit (CPU) 908 that includes one or more processors 910, which may also be referred to as CPU cores or processor cores. The CPU 908 may have cache memory 912 coupled to the CPU 908 for rapid access to temporarily stored data. The CPU 908 is coupled to a system bus 914 and can intercouple master and slave devices included in the processor-based system 900. As is well known, the CPU 908 communicates with these other devices by exchanging address, control, and data information over the system bus 914. For example, the CPU 908 can communicate bus transaction requests to a memory controller 916, as an example of a slave device. Although not illustrated in Figure X, multiple system buses 914 could be provided, wherein each system bus 914 constitutes a different fabric.

Other master and slave devices can be connected to the system bus 914. As illustrated in FIG. 9, these devices can include a memory system 920 that includes the memory controller 916 and a memory array(s) 918, one or more input devices 922, one or more output devices 924, one or more network interface devices 926, and one or more display controllers 928, as examples. Each of the memory system(s) 920, the one or more input devices 922, the one or more output devices 924, the one or more network interface devices 926, and the one or more display controllers 928 can be provided in the same or different electronic devices deploying micro-ops RAM 902. The input device(s) 922 can include any type of input device, including, but not limited to, input keys, switches, voice processors, etc. The output device(s) 924 can include any type of output device, including, but not limited to, audio, video, other visual indicators, etc. The network interface device(s) 926 can be any device configured to allow exchange of data to and from a network 930. The network 930 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 926 can be configured to support any type of communications protocol desired.

The CPU 908 may also be configured to access the display controller(s) 928 over the system bus 914 to control information sent to one or more displays 932. The display controller(s) 928 sends information to the display(s) 932 to be displayed via one or more video processor(s) 934, which process the information to be displayed into a format suitable for the display(s) 932. The display controller(s) 928 and video processor(s) 934 can be included as ICs in the same or different electronic devices deploying micro-ops-RAM 902. The display(s) 932 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, vector unit such as a single instruction multiple data (SIMD) machine or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An apparatus, comprising:
   a processing unit, comprising:
      a micro-operations (micro-ops) random access memory (RAM), comprising:
         a plurality of row circuits configured to store a plurality of register control signal parameters corresponding to a register micro-op to be processed and a plurality of execution control signal parameters corresponding to an execution micro-op to be executed;
      a register file; and
      an execution circuit;
      the processing unit configured to:
         activate a first row circuit of the plurality of row circuits to couple the plurality of register control signal parameters in the first row circuit to the register file to cause one or more operands to be provided to the execution circuit; and
         activate a second row circuit of the plurality of row circuits to couple the plurality of execution control signal parameters in the second row circuit to the execution circuit to select an operation of the execution circuit; and
      the execution circuit configured to execute the operation based on the one or more operands and the plurality of execution control signal parameters.
2. The apparatus of clause 1, wherein the first row circuit and the second row circuit are disposed in a common row circuit of the plurality of row circuits.
3. The apparatus of clause 1 or 2, wherein:
   the register file further comprises register input ports;
   the execution circuit further comprises execution circuit input ports;
   the micro-ops RAM further comprises:
      a plurality of first output ports coupled to the register input ports; and
      a plurality of second output ports coupled to the execution circuit input ports;
      the first row circuit is coupled to the plurality of first output ports; and
      the second row circuit is coupled to the plurality of second output ports.
4. The apparatus of clause 3, wherein the register file further comprises register output ports,
   wherein the one or more operands are communicated from the register file to the execution circuit through the register output ports.
5. The apparatus of any of clauses 1-4, further comprising:
   a memory storing a program comprising a plurality of micro-ops; and
   the processing unit further configured to:
      load the plurality of micro-ops into the plurality of row circuits in the micro-ops RAM.
6. The apparatus of any of clauses 1-5, wherein the micro-ops RAM is directly coupled to the register file.
7. The apparatus of any of clauses 1-6, wherein the micro-ops RAM is directly coupled to the execution circuit.
8. The apparatus of any of clauses 1-7, wherein the processing unit is further configured to activate the first row circuit in a clock cycle.
9. The apparatus of any of clauses 1-8 integrated into an integrated circuit (IC).
10. The apparatus of any of clauses 1-9 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics systems; and a multicopter.
11. A method of operating a processing unit employing a micro-operations (micro-ops) random access memory (RAM), comprising:
   providing the micro-ops RAM, the micro-ops RAM comprising:
      a plurality of row circuits configured to store a plurality of register control signal parameters corresponding to a register micro-op to be processed and a plurality of execution control signal parameters corresponding to an execution micro-op to be executed;
   activating a first row circuit of the plurality of row circuits to couple the plurality of register control signal parameters in the first row circuit to a register file to cause one or more operands to be provided to an execution circuit;
   activating a second row circuit of the plurality of row circuits to couple the plurality of execution control signal parameters in the second row circuit to the execution circuit to select an operation of the execution circuit; and
   executing the operation based on the one or more operands and the plurality of execution control signal parameters.
12. The method of clause 11, wherein the first row circuit and the second row circuit are disposed in a common row circuit of the plurality of row circuits.

13. The method of clause 11 or 12, wherein:
the register file further comprises register input ports;
the execution circuit further comprises execution circuit input ports;
the micro-ops RAM further comprises:
a plurality of first output ports coupled to the register input ports; and
a plurality of second output ports coupled to the execution circuit input ports;
the first row circuit is coupled to the plurality of first output ports; and
the second row circuit is coupled to the plurality of second output ports.
14. The method of clause 13, wherein the register file further comprises register output ports,
wherein activating the first row circuit further comprises:
communicating the one or more operands from the register file to the execution circuit through the register output ports.
15. The method of any of clauses 11-14, further comprising:
storing a plurality of micro-ops in a memory; and
loading the plurality of micro-ops into the plurality of row circuits in the micro-ops RAM.
16. The method of any of clauses 11-15, further comprising directly coupling the micro-ops RAM to the register file.
17. The method of any of clauses 11-16, further comprising directly coupling the micro-ops RAM to the execution circuit.
18. The method of any of clauses 11-17, wherein activating the first row circuit further comprises activating the first row circuit in a clock cycle.
19. The method of any of clauses 11-18, wherein:
activating the first row circuit further comprises:
activating the first row circuit in a clock cycle; and
activating the second row circuit further comprises:
activating the second row circuit in the clock cycle.
20. An apparatus, comprising:
a processing unit, comprising:
a micro-operations (micro-ops) random access memory (RAM), comprising:
a plurality of row circuits configured to store a plurality of register control signal parameters corresponding to a register micro-op to be processed and a plurality of execution control signal parameters corresponding to an execution micro-op to be executed;
a register file; and
an execution circuit;
means for activating a first row circuit of the plurality of row circuits to couple the plurality of register control signal parameters in the first row circuit to the register file to cause one or more operands to be provided to the execution circuit;
means for activating a second row circuit of the plurality of row circuits to couple the plurality of execution control signal parameters in the second row circuit to the execution circuit to select an operation of the execution circuit; and
means for executing the operation based on the one or more operands and the plurality of execution control signal parameters.
21. The apparatus of clause 20, wherein the first row circuit and the second row circuit are disposed in a common row circuit of the plurality of row circuits.

22. The apparatus of clause 20 or 21, further comprising:
means for storing a plurality of micro-ops in a memory; and
means for loading the plurality of micro-ops into the plurality of row circuits in the micro-ops RAM.
23. The apparatus of clause 20, wherein the means for activating the first row circuit further comprises:
means for activating the first row circuit in a clock cycle.
24. The apparatus of clause 21, wherein:
the means for activating the first row circuit further comprises:
means for activating the first row circuit in a clock cycle; and
the means for activating the second row circuit further comprises:
means for activating the second row circuit in the clock cycle.

What is claimed is:
1. An apparatus, comprising:
a processing unit, comprising:
a micro-operations (micro-ops) random access memory (RAM), comprising:
a plurality of row circuits configured to store a plurality of register control signal parameters corresponding to a register micro-op to be processed and a plurality of execution control signal parameters corresponding to an execution micro-op to be executed;
a register file; and
an execution circuit;
the processing unit configured to:
activate a first row circuit of the plurality of row circuits to couple the plurality of register control signal parameters in the first row circuit to the register file to cause one or more operands to be provided to the execution circuit; and
activate a second row circuit of the plurality of row circuits to couple the plurality of execution control signal parameters in the second row circuit to the execution circuit to select an operation of the execution circuit; and
the execution circuit configured to execute the operation based on the one or more operands and the plurality of execution control signal parameters.
2. The apparatus of claim 1, wherein the first row circuit and the second row circuit are disposed in a common row circuit of the plurality of row circuits.
3. The apparatus of claim 1, wherein:
the register file further comprises register input ports;
the execution circuit further comprises execution circuit input ports;
the micro-ops RAM further comprises:
a plurality of first output ports coupled to the register input ports; and
a plurality of second output ports coupled to the execution circuit input ports;
the first row circuit is coupled to the plurality of first output ports; and
the second row circuit is coupled to the plurality of second output ports.
4. The apparatus of claim 3, wherein the register file further comprises register output ports,
wherein the one or more operands are communicated from the register file to the execution circuit through the register output ports.

5. The apparatus of claim 1, further comprising:
a memory storing a program comprising a plurality of micro-ops; and
the processing unit further configured to:
load the plurality of micro-ops into the plurality of row circuits in the micro-ops RAM.

6. The apparatus of claim 1, wherein the micro-ops RAM is directly coupled to the register file.

7. The apparatus of claim 1, wherein the micro-ops RAM is directly coupled to the execution circuit.

8. The apparatus of claim 1, wherein the processing unit is further configured to activate the first row circuit in a clock cycle.

9. The apparatus of claim 1 integrated into an integrated circuit (IC).

10. The apparatus of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics systems; and a multicopter.

11. A method of operating a processing unit employing a micro-operations (micro-ops) random access memory (RAM), comprising:
providing the micro-ops RAM, the micro-ops RAM comprising:
a plurality of row circuits configured to store a plurality of register control signal parameters corresponding to a register micro-op to be processed and a plurality of execution control signal parameters corresponding to an execution micro-op to be executed;
activating a first row circuit of the plurality of row circuits to couple the plurality of register control signal parameters in the first row circuit to a register file to cause one or more operands to be provided to an execution circuit;
activating a second row circuit of the plurality of row circuits to couple the plurality of execution control signal parameters in the second row circuit to the execution circuit to select an operation of the execution circuit; and
executing the operation based on the one or more operands and the plurality of execution control signal parameters.

12. The method of claim 11, wherein the first row circuit and the second row circuit are disposed in a common row circuit of the plurality of row circuits.

13. The method of claim 11, wherein:
the register file further comprises register input ports;
the execution circuit further comprises execution circuit input ports;
the micro-ops RAM further comprises:
a plurality of first output ports coupled to the register input ports; and
a plurality of second output ports coupled to the execution circuit input ports;
the first row circuit is coupled to the plurality of first output ports; and
the second row circuit is coupled to the plurality of second output ports.

14. The method of claim 13, wherein the register file further comprises register output ports,
wherein activating the first row circuit further comprises:
communicating the one or more operands from the register file to the execution circuit through the register output ports.

15. The method of claim 11, further comprising:
storing a plurality of micro-ops in a memory; and
loading the plurality of micro-ops into the plurality of row circuits in the micro-ops RAM.

16. The method of claim 11, further comprising directly coupling the micro-ops RAM to the register file.

17. The method of claim 11, further comprising directly coupling the micro-ops RAM to the execution circuit.

18. The method of claim 11, wherein activating the first row circuit further comprises activating the first row circuit in a clock cycle.

19. The method of claim 12, wherein:
activating the first row circuit further comprises:
activating the first row circuit in a clock cycle; and
activating the second row circuit further comprises:
activating the second row circuit in the clock cycle.

20. An apparatus, comprising:
a processing unit, comprising:
a micro-operations (micro-ops) random access memory (RAM), comprising:
a plurality of row circuits configured to store a plurality of register control signal parameters corresponding to a register micro-op to be processed and a plurality of execution control signal parameters corresponding to an execution micro-op to be executed;
a register file; and
an execution circuit;
means for activating a first row circuit of the plurality of row circuits to couple the plurality of register control signal parameters in the first row circuit to the register file to cause one or more operands to be provided to the execution circuit;
means for activating a second row circuit of the plurality of row circuits to couple the plurality of execution control signal parameters in the second row circuit to the execution circuit to select an operation of the execution circuit; and
means for executing the operation based on the one or more operands and the plurality of execution control signal parameters.

21. The apparatus of claim 20, wherein the first row circuit and the second row circuit are disposed in a common row circuit of the plurality of row circuits.

22. The apparatus of claim 20, further comprising:
means for storing a plurality of micro-ops in a memory; and
means for loading the plurality of micro-ops into the plurality of row circuits in the micro-ops RAM.

23. The apparatus of claim 20, wherein the means for activating the first row circuit further comprises:
means for activating the first row circuit in a clock cycle.

24. The apparatus of claim 21, wherein:
the means for activating the first row circuit further comprises:
means for activating the first row circuit in a clock cycle; and
the means for activating the second row circuit further comprises:
means for activating the second row circuit in the clock cycle.

* * * * *